United States Patent [19]
Blomstrom et al.

[11] 3,889,769
[45] June 17, 1975

[54] SUSPENSION ARRANGEMENT FOR A TRACK-TYPE VEHICLE

[75] Inventors: Gary D. Blomstrom, Waverly, Nebr.; Donald A. Piepho; Victor Randour, both of Aurora, Ill.; Lyle E. York, Peoria, Ill.

[73] Assignee: Caterpillar Tractor Co., Peoria, Ill.

[22] Filed: Sept. 9, 1974

[21] Appl. No.: 504,063

[52] U.S. Cl. .................. 180/9.5; 305/16
[51] Int. Cl. ........................... B62d 55/10
[58] Field of Search ........ 180/9.5, 9.46, 9.48, 9.54; 305/16, 17

[56] References Cited
UNITED STATES PATENTS
2,988,159  6/1961  Weber .................. 180/9.5
3,096,840  7/1963  Mazzarins ............. 180/9.5

*Primary Examiner*—Philip Goodman
*Attorney, Agent, or Firm*—Phillips, Moore, Weissenberger, Lempio & Strabala

[57] ABSTRACT

A crawler tractor includes a track roller frame disposed on each side thereof, and associated with the main frame so as to be pivotable relative thereto about a generally horizontal transverse axis. Equalizer bar structure is associated with the track frames forwardly of such horizontal pivot axis, with the equalizer bar thereof being pivotable about a shaft, the longitudinal axis of which is disposed in a plane in which the generally horizontal axis lies. The equalizer bar is allowed to move to an extent along the longitudinal axis of such shaft during pivoting of the track roller frames.

9 Claims, 5 Drawing Figures

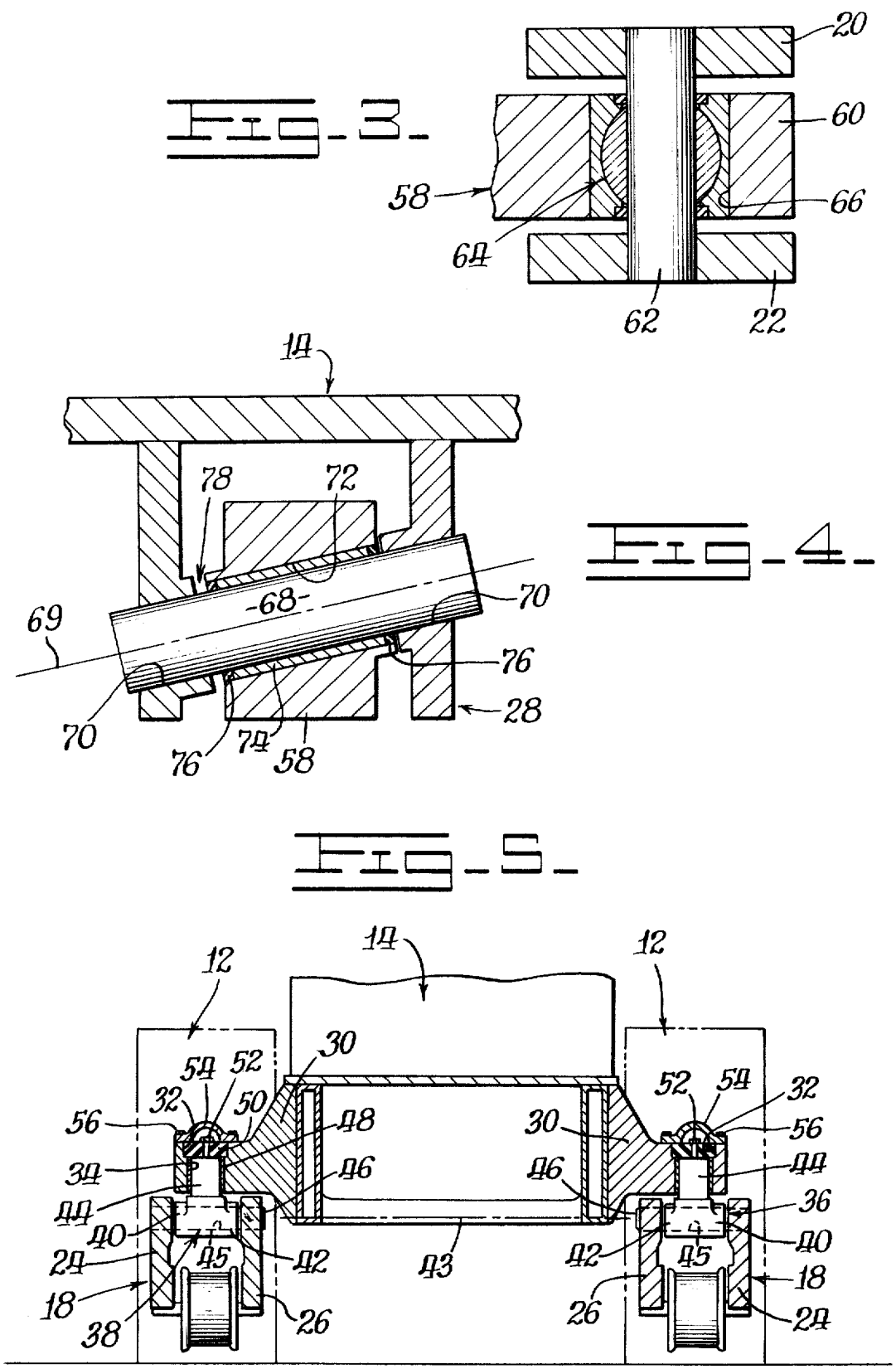

3,889,769

SUSPENSION ARRANGEMENT FOR A TRACK-TYPE VEHICLE

BACKGROUND OF THE INVENTION

This invention relates to crawler tractors, and more particularly, to the type of crawler tractor which includes an equalizer bar for equal transfer of loads applied through the forward ends of the track roller frames to the main frame of the vehicle.

Conventional track-type tractors include a main frame having associated therewith a pair of endless track assemblies, each including a track roller frame. Each track roller frame is normally pivotally mounted on the main frame to permit the track roller frame to oscillate relative thereto during tractor operation. In some instances, an equalizer bar is pivotally mounted to the tractor main frame and has its ends individually pivotally connected to the track roller frames so that transverse external loads applied to the forward ends of the track roller frames are transmitted to the main frame.

Generally, one of the problems associated with such an arrangement is that the pivotal connection of the equalizer bar to the main frame is horizontally disposed and elevationally higher than the track roller frame pivots (see for example U.S. Pat. No. 2,936,841 to Mazzarins, and U.S. Pat. No. 2,786,724 to Armington et al.). With such configuration of structure, during oscillation of the track roller frames, the pivotal connections between the track roller frames and the equalizer bar will move in arcuate paths about the track roller frame pivots, with one of such pivotal connections being displaced forwardly while the other of such pivotal connections is displaced rearwardly. This causes canting of the equalizer bar relative to the longitudinal axis of the vehicle, and various relatively complicated mechanisms have been proposed for eliminating or accommodating such motion, including pivotally connecting the equalizer bar to a turntable-like member on the vehicle main frame, or connecting the equalizer bar to the main frame with a resilient pivotal connection (see U.S. Pat. No. 2,936,841 cited above).

Of general interest in this area are U.S. Pat. Nos. 2,988,159 to Weber, 3,177,961 to Potter, 2,978,050 to Risk et al.; and 3,576,226 to Copeland, these last two patents assigned to the assignee of this application.

SUMMARY OF THE INVENTION

It is accordingly an object of this invention to provide means for eliminating the canting of an equalizer bar relative to the longitudinal axis of a crawler tractor-type vehicle with which it is associated.

It is a further object of this invention to provide means which, while fulfilling the above object, are extremely simple in design and operation, and effective to use.

Broadly stated, the crawler tractor herein comprises main frame means, and first and second longitudinally extending track frames on either side of the main frame means. Pivotal connecting means are disposed between the rearward end of the track frames and the main frame means to allow pivotal movement of the track frames relative to the main frame means generally about a substantially horizontal axis. A shaft is mounted relative to the main frame means and positioned forwardly of and above the substantially horizontal axis, and has its longitudinal axis disposed in a plane in which the substantially horizontal axis lies. A generally transversely extending equalizer bar is included, and defines adjacent its mid-portion a bore through which the shaft is disposed, the equalizer bar being pivotable about the longitudinal axis of the shaft and slidable therealong. Means pivotally connect the respective ends of the equalizer bar with the track frames forwardly of the track frame and the main frame means pivotal connecting means, the equalizer bar-track frame pivotal connections lying substantially along a straight line, a line along which the longitudinal axis of the shaft lies. The equalizer bar may slide along and pivot about the longitudinal axis of the shaft during pivoting of the track frames relative to the main frame means generally about the substantially horizontal axis.

BRIEF DESCRIPTION OF THE DRAWINGS

These and other objects of the invention will become apparent from a study of the following specification and drawings, in which:

FIG. 3 is a sectional view taken along the line III—III of FIG. 2;

FIG. 4 is a side sectional elevation of the equalizer bar and structure associated therewith;

FIG. 5 is a sectional view taken along the line V—V of FIG. 1.

DESCRIPTION OF THE PREFERRED EMBODIMENT

Figure 1:
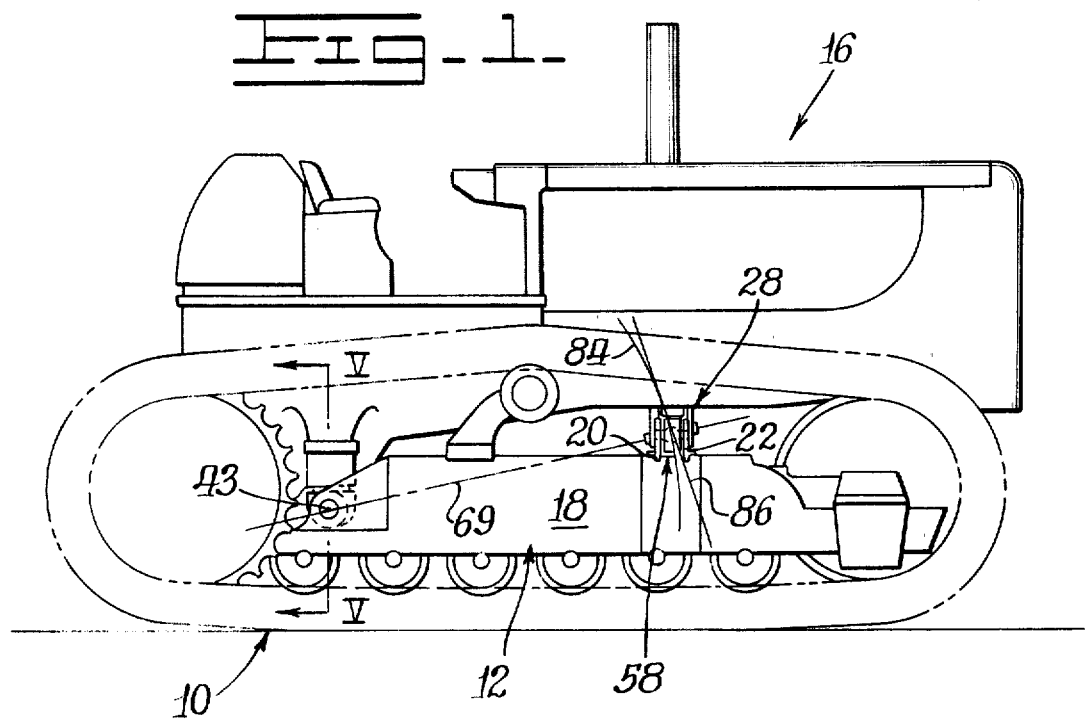
FIG. 1 is a side-elevational view of a crawler tractor embodying the invention.

Referring to the drawings, a suspension arrangement is generally indicated at 10 for connecting a pair of laterally-spaced endless track assemblies 12 to opposite sides of a main frame 14 of a vehicle such as a tractor 16. The vehicle 16 is disposed for movement along a longitudinal axis thereof. The track assemblies 12 include track roller frames 18 which extend longitudinally on either side of the main frame 14. Each roller frame 18 includes a pair of longitudinally spaced vertically extending plates 20, 22 integrally secured thereon adjacent its forward end. As most clearly shown in FIG. 5, a pair of laterally spaced vertical plate members 24, 26 are provided at the rearward end of each track roller frame 18.

The vehicle main frame 14 has a transversely extending saddle member 28 of inverted U-shaped cross section integrally secured thereon (see FIG. 4). As shown in FIG. 5, a pair of brackets 30 extend laterally outwardly from opposite sides of the frame 14 adjacent the rearward end thereof. Each bracket 30 has a pair of vertically disposed concentric bores 32, 34 formed therein adjacent its distal end.

The suspension arrangement includes a pair of kingpin arrangements 36 individually connecting the rearward ends of the track roller frames 18 to the main frame 14. As shown in FIG. 5, each kingpin arrangement 36 includes a substantially T-shaped member 38, having its oppositely extending arms 40, 42 disposed generally horizontally, and having its remaining substantially cylindrical arm 44 disposed substantially vertically. Each member 38 has its arms 40, 42 disposed between the plate members 24, 26. A bore 45 is provided in and along the arms 40, 42 and receives a horizontally disposed pin 46 which pivotally secures the member 38 to the roller frame 18. The remaining cylindrical arm 44 extends upwardly to be rotatably disposed within a sleeve bearing 48 press-fitted into the bore 34. A resilient pad 50 is disposed within the bore 32 and is secured to the axial end of the arm 44 by a bolt 52. The resilient pad 50 is retained in the bore 32 by a cap 54 secured to the bracket 30 by a plurality of capscrews 56.

It will be seen that such substantially T-shaped members 38 provide pivotal connecting means between the rearward ends of the track frames 18 and the main frames 14 to allow pivotal movement of the track frames 18 relative to the main frame 14 generally about a substantially horizontal axis 43 generally defined by the oppositely extending arms 40, 42 of the substantially T-shaped members 38. Additionally, such substantially T-shaped members 38 provide means for allowing pivotal movement of each track frame 18 relative to the main frame 14 about a substantially vertical axis, defined by the remaining arm 44 of each of the substantially T-shaped members 38.

Figure 2:
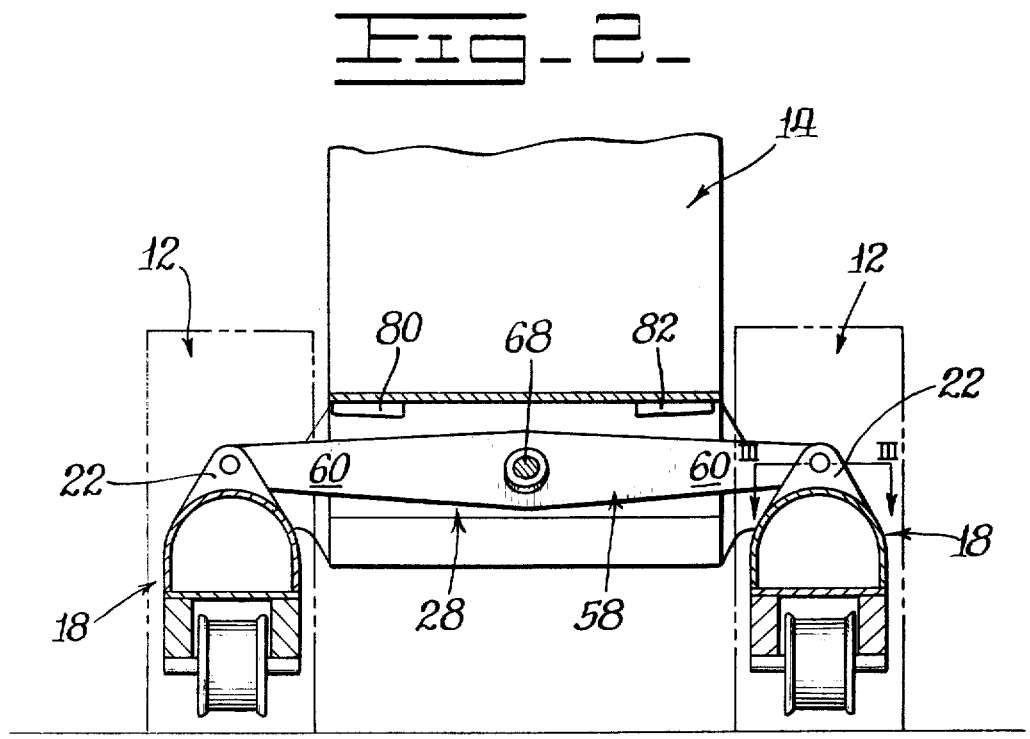
FIG. 2 is a front sectional elevation of the crawler tractor of FIG. 1.

As clearly shown in FIGS. 2 and 3, the suspension arrangement further includes a transversely-extending elongated equalizer bar 58 which has each of its opposite ends 60 individually disposed between and connected to the plates 20, 22 of the spaced track roller frames 18 by means of a pivot pin 62 extending through a spherical bearing 64 disposed within a longitudinally aligned bore 66 of the equalizer bar 58. Such means act as universal-joint means connecting the respective ends 60 of the equalizer bar 58 with the track frames 18. The equalizer bar 58 is disposed within the U-shaped saddle member 28 and is pivotally connected thereto by a shaft 68 mounted in bores 70 formed in the saddle member 28, so as to be secured relative to the main frame 14. The shaft 68 is positioned forwardly of and above the substantially horizontal axis 43 defined by the oppositely extending arms 40, 42 of the substantially T-shaped members 38, and is disposed so that its longitudinal axis 69 lies in a plane in which such substantially horizontal axis 43 lies.

The equalizer bar 58 defines adjacent its midportion a bore 72 through which the shaft 68 is disposed, with a bushing 74 being disposed about the shaft 68 and within the bore 72, and further with a pair of resilient seals 76 disposed within the bore 72 at opposite ends of the bushing 74.

The equalizer bar 58 is thus pivotable about the longitudinal axis 69 of the shaft 68 and slidable therealong to an extent, the space shown at 78 being provided to allow such sliding movement.

Further included are first and second resilient pads 80, 82 mounted relative to the main frame 14 on either side of the shaft. Such resilient pads 80, 82 act as stop means which may be contacted by the equalizer bar 58 to limit pivoting of the equalizer bar 58 about the longitudinal axis 69 of the shaft 68.

In operation, when the vehicle 10 travels over uneven terrain, the forward end of one track roller frame 18 will oscillate upwardly generally about the substantially horizontal axis 43 while the other track roller frame oscillates downwardly generally about substantially the same axis 43, due to their common connection by the equalizer bar 58. During such operation, the centers of the spherical bearings 64 will travel in an arcuate path as shown at 84 in FIG. 1. If the equalizer bar 58 was not connected to the track roller frames 18, its ends 60, as well as the centers of the spherical bearings 64, would travel in a plane perpendicular to the longitudinal axis 69 of the shaft 68 as it pivots thereabout. Such plane is indicated by the straight line at 86. With the longitudinal axis 69 of the shaft 68 being disposed in a plane in which the substantially horizontal axis lies, the plane 86 is tangent to the arc 84. However, with the ends 60 of the equalizer bar 58 being pivotally connected to the track roller frames 18 by the pivot pins 62, the centers of the spherical bearings 64 and thus the ends 60 of the equalizer bar 58 follow the arcuate path 84 of the spherical bearings 64 as the roller frames 18 oscillate. The spherical bearings 64 move rearwardly equally relative to the plane 86 regardless of which roller frame 18 oscillates upwardly or downwardly. Thus, the equalizer bar 58 slides rearwardly on the shaft 68 during oscillation of the track roller frames 18, the space 78 being provided as set forth above to accommodate such sliding movement of the equalizer bar 58. The equalizer bar 58 of course slides along the shaft 68 in the opposite direction during movement of the track roller frames 18 back toward their original positions.

Likewise, during oscillation of the track roller frames 18, the equalizer bar 58 will pivot about the longitudinal axis 69 of the shaft 68 to in turn cause the pivot pin 62 to travel in an arcuate path about the shaft 68. Through such action, the forward ends of the track roller frames 18 are pulled in slightly toward the main frame 14, with such motion causing the track roller frames 18 to pivot about the vertical axis defined by the arms 44 of the members 38.

What is claimed is:

1. A crawler tractor comprising:
   main frame means;
   first and second longitudinally-extending track frames on either side of the main frame means;
   pivotal connecting means between the rearward ends of the track frames and the main frame means to allow pivotal movement of the track frames relative to the main frame means generally about a substantially horizontal axis;
   a shaft mounted relative to the main frame means and positioned forwardly of and above the substantially horizontal axis, and having its longitudinal axis disposed in a plane in which said substantially horizontal axis lies;
   a generally transversely extending equalizer bar defining adjacent its mid-portion a bore through which said shaft is disposed, the equalizer bar being pivotable about the longitudinal axis of the shaft and slidable therealong;
   means pivotally connecting the respective ends of the equalizer bar with the track frames forwardly of the track frame and main frame means pivotal connecting means, such equalizer bar-track frame pivotal connections lying substantially along a straight line which intersects a line along which the longitudinal axis of the shaft lies;
   the equalizer bar sliding along and pivoting about the longitudinal axis of said shaft during pivoting of the track frames relative to the main frame means generally about said substantially horizontal axis.

2. The crawler tractor of claim 1 wherein the track frame and main frame means pivotal connecting means further comprise means for allowing pivotal movement of each track frame relative to the main frame means about a substantially vertical axis.

3. The crawler tractor of claim 2 wherein the track frame and main frame means pivotal connecting means comprise a first substantially T-shaped member associated with the first track frame and main frame means and a second substantially T-shaped member associated with the second track frame and the main frame means, the oppositely extending arms of the substantially T-shaped members generally defining said substantially horizontal axis, and the remaining arm of each substantially T-shaped member defining one of the substantially vertical axes.

4. The crawler tractor of claim 3 wherein the means connecting the respective ends of the equalizer bar with the track frames comprise universal joint means.

5. The crawler tractor of claim 4 and further comprising resilient stop means associated with the main frame means and which may be contacted by the equalizer bar to limit pivoting of said equalizer bar about said longitudinal axis of the shaft.

6. The crawler tractor of claim 5 wherein the stop means comprises first and second resilient pads mounted relative to the main frame means on either side of the shaft.

7. The crawler tractor of claim 1 and further comprising resilient stop means associated with the main frame means and which may be contacted by the equalizer bar to limit pivoting of said equalizer bar about the longitudinal axis of the shaft.

8. The crawler tractor of claim 7 wherein the stop means comprise first and second resilient pads mounted relative to the main frame means on either side of the shaft.

9. A crawler tractor comprising:
main frame means;
first and second longitudinally-extending track frames on either side of the main frame means;
pivotal connecting means between the rearward ends of the track frames and the main frame means to allow pivotal movement of each track frame relative to the main frame means generally about a substantially horizontal axis and to allow pivotal movement of each track frame relative to the main frame means about a substantially vertical axis;
wherein the track frame and main frame means pivotal connecting means comprise a first substantially T-shaped member associated with the first track frame and main frame means and a second substantially T-shaped member associated with the second track frame and the main frame means, the oppositely-extending arms of each substantially T-shaped member generally defining said substantially horizontal axis, about which the associated track frame is generally pivotable, and the remaining arm of each substantially T-shaped member defining a substantially vertical axis, about which the associated track frame is pivotable.

* * * * *